(12) United States Patent
Sato

(10) Patent No.: US 9,341,829 B2
(45) Date of Patent: May 17, 2016

(54) ZOOM LENS, IMAGING DEVICE AND METHOD FOR MANUFACTURING THE ZOOM LENS

(75) Inventor: Haruo Sato, Kawaguchi (JP)

(73) Assignee: Nikon Corporation, Tokyo (JP)

(*) Notice: Subject to any disclaimer, the term of this patent is extended or adjusted under 35 U.S.C. 154(b) by 23 days.

(21) Appl. No.: 13/991,996

(22) PCT Filed: Oct. 31, 2011

(86) PCT No.: PCT/JP2011/006083
§ 371 (c)(1),
(2), (4) Date: Jun. 6, 2013

(87) PCT Pub. No.: WO2012/077276
PCT Pub. Date: Jun. 14, 2012

(65) Prior Publication Data
US 2013/0258496 A1  Oct. 3, 2013

(30) Foreign Application Priority Data

Dec. 7, 2010  (JP) ................................ 2010-272910

(51) Int. Cl.
*G02B 15/14* (2006.01)
*G02B 9/34* (2006.01)
*G02B 13/18* (2006.01)
*G02B 15/173* (2006.01)

(52) U.S. Cl.
CPC  *G02B 15/14* (2013.01); *G02B 9/34* (2013.01); *G02B 13/18* (2013.01); *G02B 15/173* (2013.01); *Y10T 29/49826* (2015.01)

(58) Field of Classification Search
CPC ................................. G02B 15/14; G02B 9/34
USPC ........................................................... 359/687
See application file for complete search history.

(56) References Cited

U.S. PATENT DOCUMENTS

| | | | | |
|---|---|---|---|---|
| 3,027,805 A | * | 4/1962 | Yamaji | 359/687 |
| 4,439,017 A | * | 3/1984 | Yamaguchi | 359/687 |
| 4,818,083 A | | 4/1989 | Mihara | |
| 5,032,013 A | | 7/1991 | Shibayama | |
| 5,221,994 A | | 6/1993 | Nishio | |
| 5,530,592 A | * | 6/1996 | Tochigi | 359/687 |
| 5,870,231 A | | 2/1999 | Takada | |

(Continued)

FOREIGN PATENT DOCUMENTS

| JP | 62-024213 A | 2/1987 |
|---|---|---|
| JP | 63-029718 A | 2/1988 |

(Continued)

*Primary Examiner* — Jordan Schwartz
*Assistant Examiner* — George G King
(74) *Attorney, Agent, or Firm* — Shapiro, Gabor and Rosenberger, PLLC

(57) ABSTRACT

A zoom lens has, in order from an object, a first lens group (G1) having positive refractive power; a second lens group (G2) having negative refractive power; a third lens group (G3) having positive refractive power; and a fourth lens group (G4) having positive refractive power. Zooming is performed by changing an air gap between the lens groups. The fourth lens group (G4) includes, in order from the object, a lens component (La) having positive or negative refractive power, a positive lens component (Lb), and a positive lens component (Lc) having a convex surface facing the object. Specified conditional expressions are satisfied.

10 Claims, 10 Drawing Sheets

(56) References Cited

U.S. PATENT DOCUMENTS

| | | |
|---|---|---|
| 6,178,049 B1 | 1/2001 | Mukaiya et al. |
| 6,226,130 B1 | 5/2001 | Mukaiya et al. |
| 6,304,388 B1* | 10/2001 | Shimo .................... 359/687 |
| 6,414,799 B1* | 7/2002 | Uzawa et al. ............ 359/687 |
| 2003/0072086 A1 | 4/2003 | Uzawa et al. |
| 2010/0188554 A1 | 7/2010 | Mimura |
| 2010/0238563 A1* | 9/2010 | Miyajima ................. 359/687 |

FOREIGN PATENT DOCUMENTS

| | | |
|---|---|---|
| JP | 63-070218 A | 3/1988 |
| JP | 63-123009 A | 5/1988 |
| JP | 03-029912 A | 2/1991 |
| JP | 04-361214 A | 12/1992 |
| JP | 06-051199 A | 2/1994 |
| JP | 06-300967 A | 10/1994 |
| JP | 06-317750 A | 11/1994 |
| JP | 08-082743 A | 3/1996 |
| JP | 09-021949 A | 1/1997 |
| JP | 09-281390 A | 10/1997 |
| JP | 2000-321499 A | 11/2000 |
| JP | 2010-152076 A | 7/2010 |
| JP | 2010-217549 A | 9/2010 |

* cited by examiner

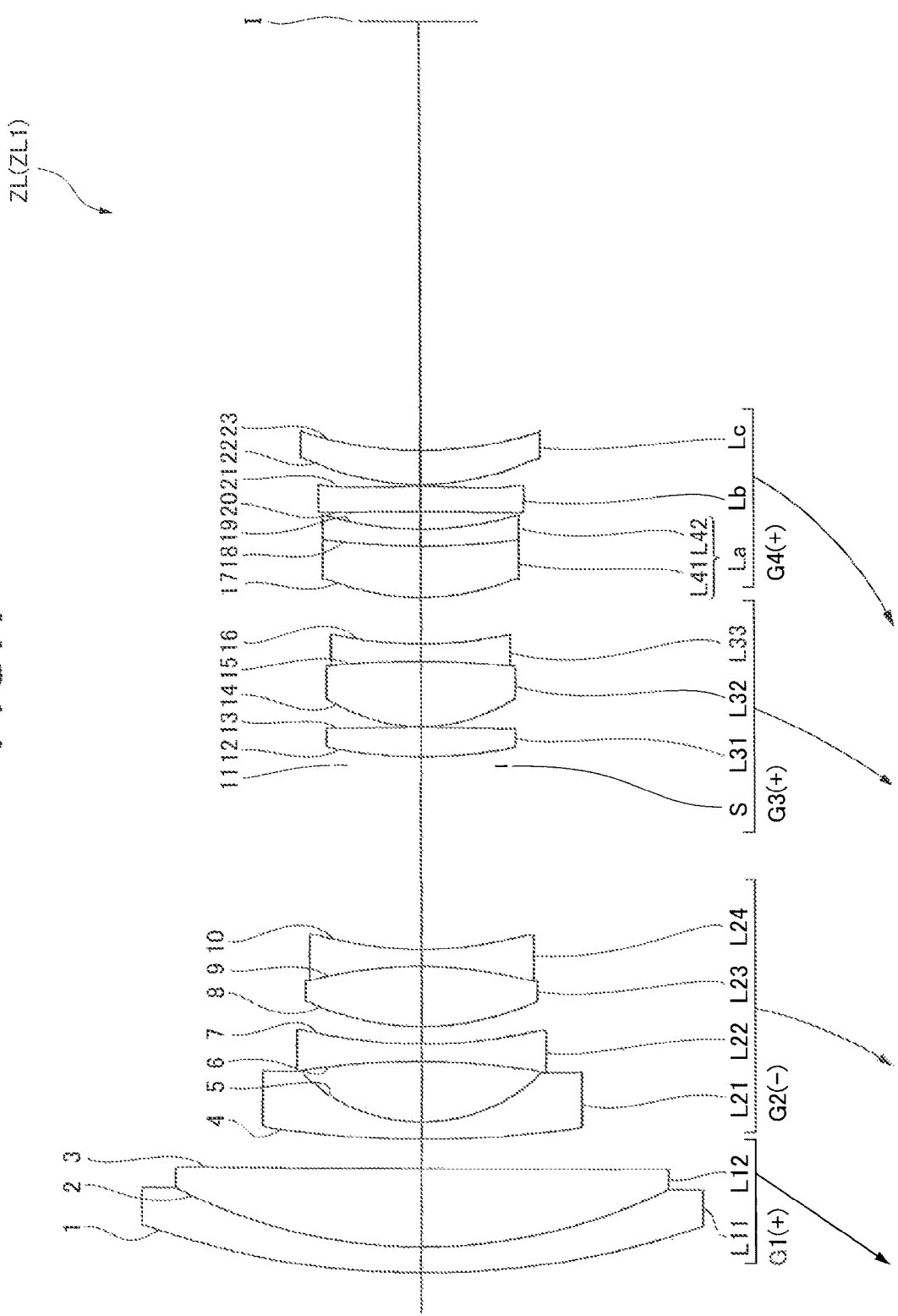

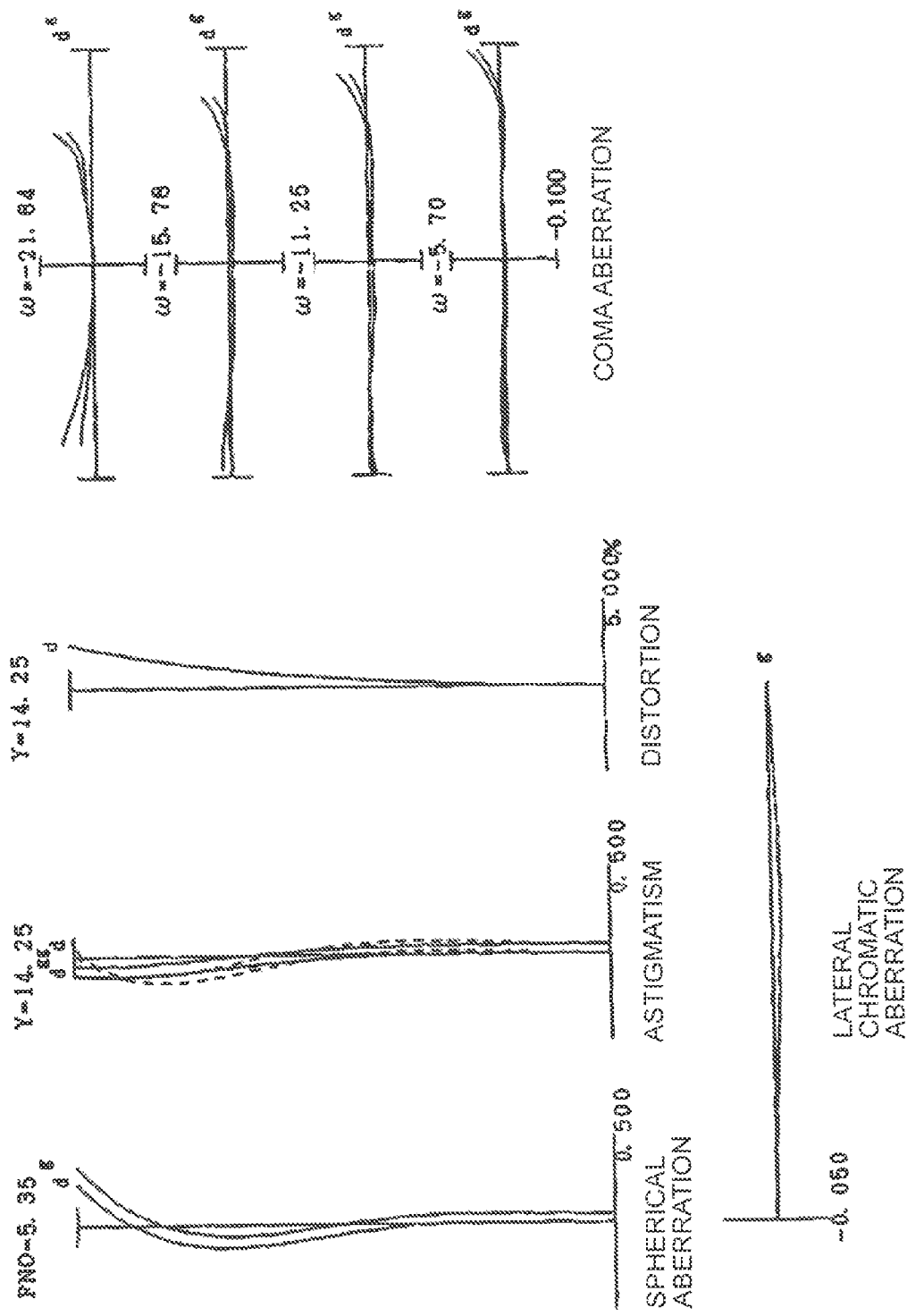

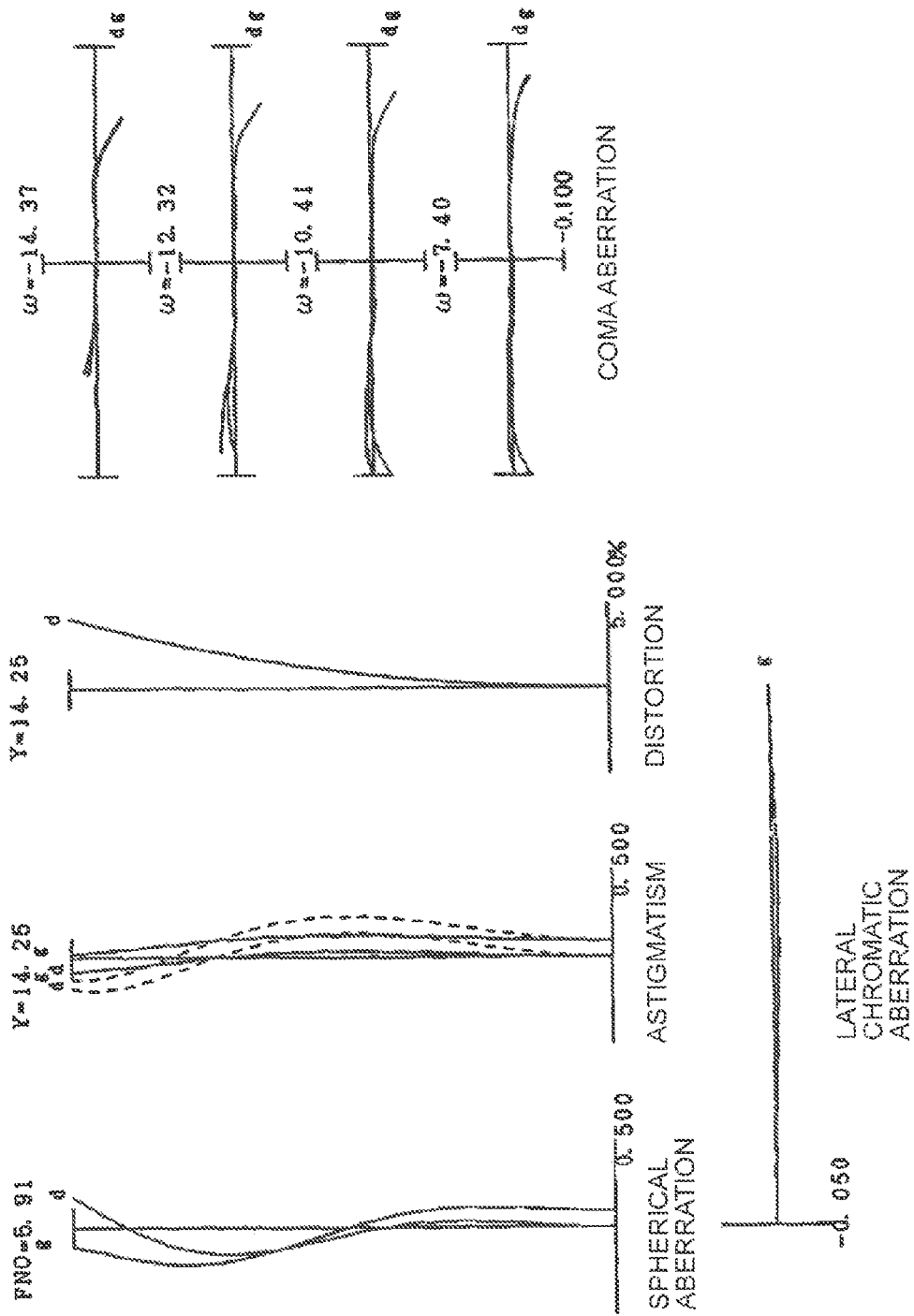

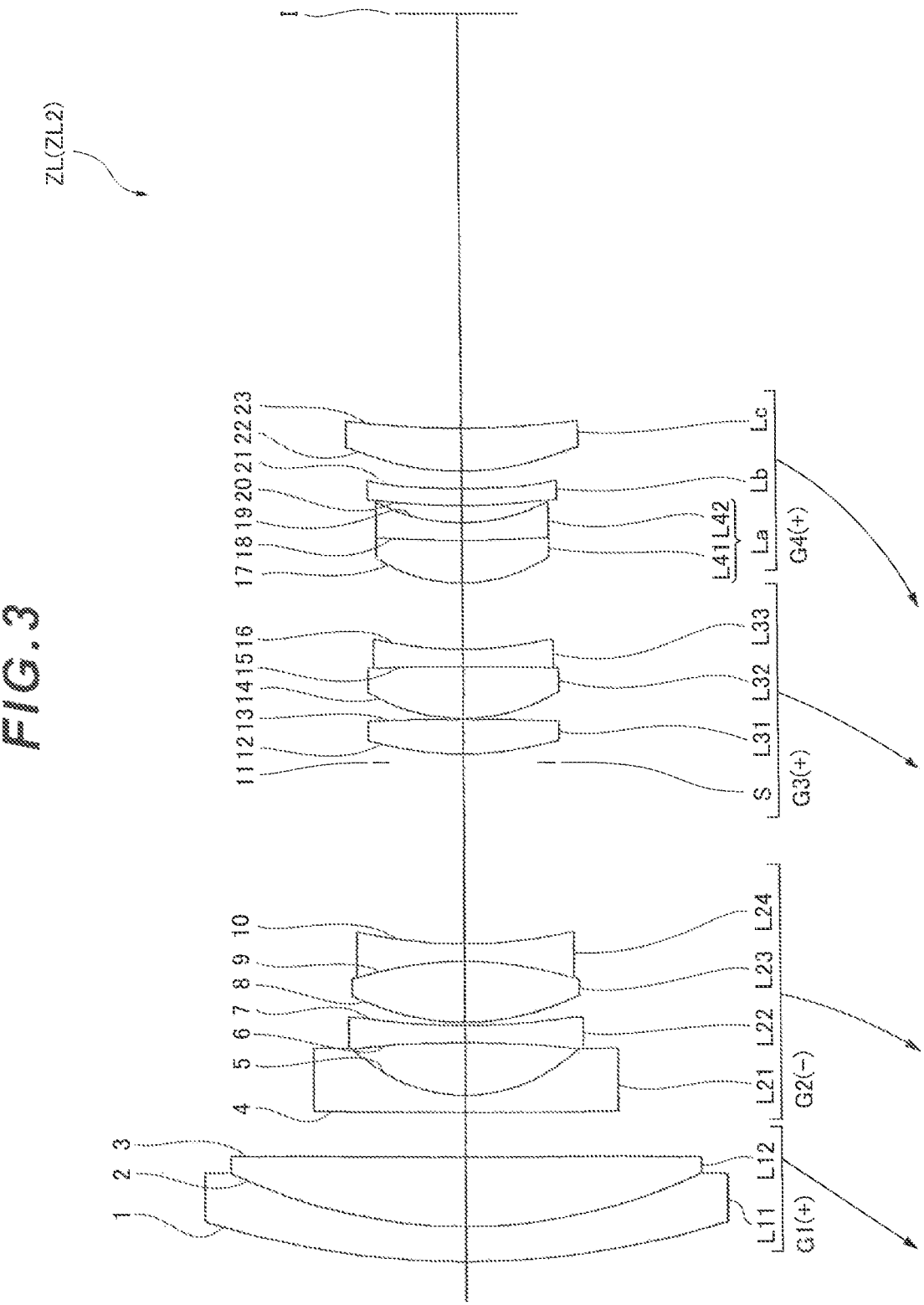

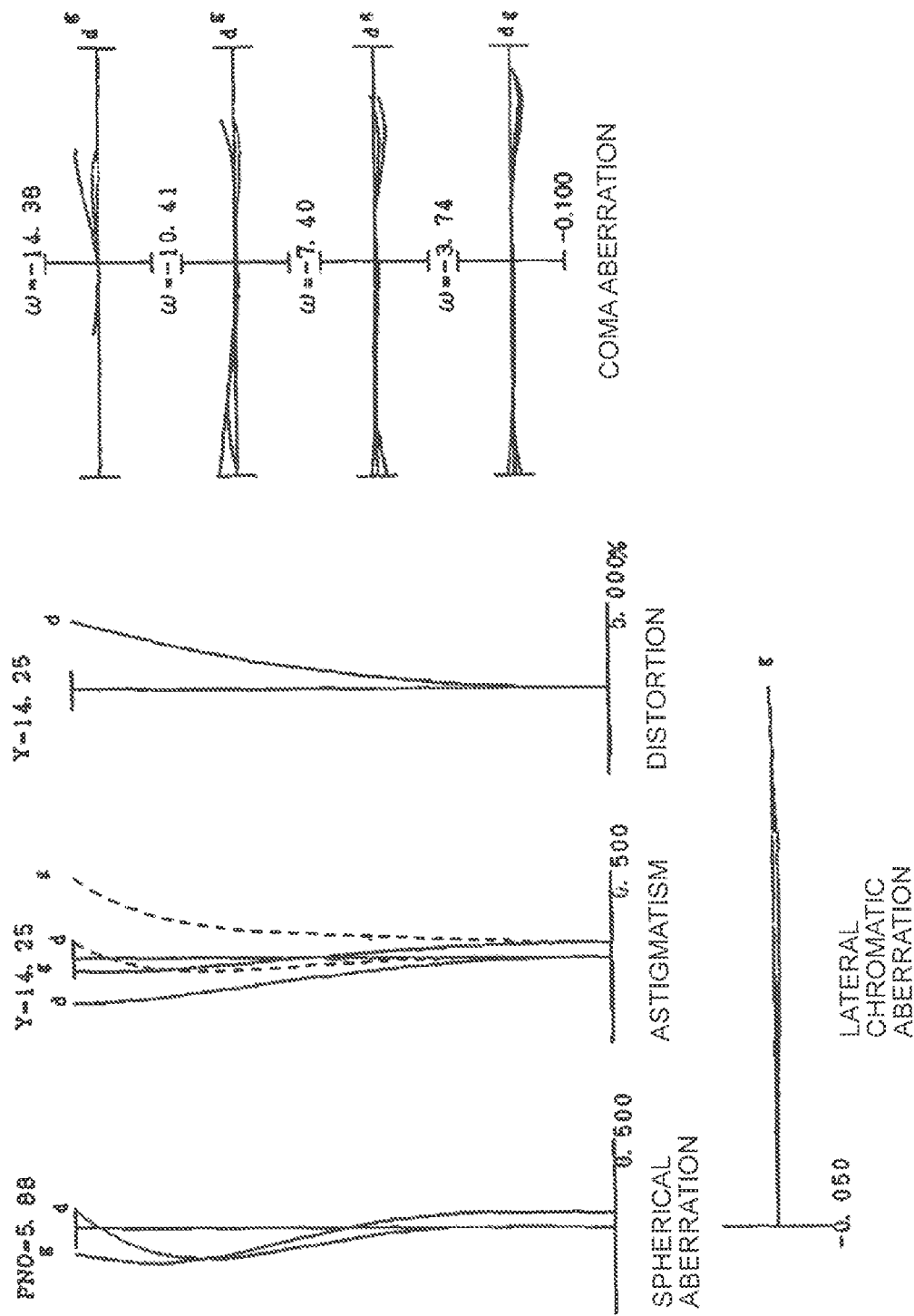

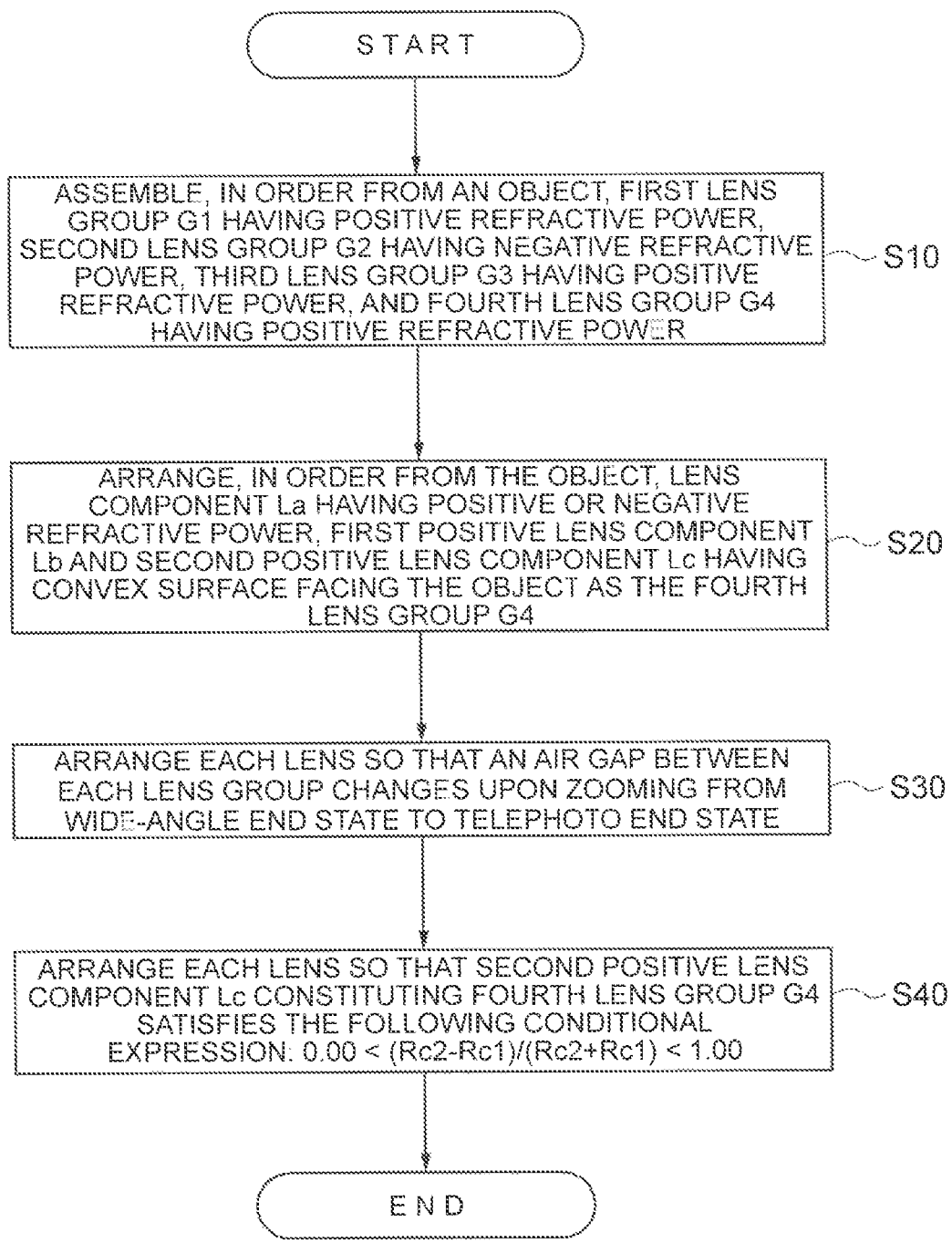

ZOOM LENS, IMAGING DEVICE AND METHOD FOR MANUFACTURING THE ZOOM LENS

TECHNICAL FIELD

The present invention relates to a zoom lens, an imaging device and a method for manufacturing the zoom lens.

TECHNICAL BACKGROUND

A miniaturized zoom lens has been conventionally proposed (e.g. see Patent Document 1).

PRIOR ARTS LIST

Patent Document

Patent Document 1: Japanese Laid-Open Patent Publication No. H3-29912(A)

Conventional zoom lenses, however, are insufficient in terms of miniaturization. If refractive power of each lens group is increased in order to implement miniaturization and higher performance, lens configuration becomes complicated because of the necessity of correcting aberrations and the number of constituting lenses increases, resulting in an increase in the size of the zoom lens, which is the opposite of the intention.

SUMMARY OF THE INVENTION

Problems to be Solved by the Invention

With the foregoing in view, it is an object of the present invention to provide a zoom lens which is miniaturized, constituted by a small number of lenses, has high performance and little aberrations, an imaging device including this zoom lens, and a method for manufacturing this zoom lens.

Means to Solve the Problems

To achieve this object, the present invention includes, in order from an object: a first lens group having positive refractive power; a second lens group having negative refractive power; a third lens group having positive refractive power; and a fourth lens group having positive refractive power, wherein zooming is performed by changing an air gap between the lens groups, the fourth lens group includes, in order from the object, a lens component having positive or negative refractive power, a positive lens component, and a positive lens component having a convex surface facing the object, and the following conditional expression is satisfied.

$$0.00 < (Rc2-Rc1)/(Rc2+Rc1) < 1.00$$

where Rc2 denotes a radius of curvature of an image side surface of the positive lens component which constitutes the fourth lens group and has the convex surface facing the object, and Rc1 denotes a radius of curvature of an object side surface of the positive lens component which constitutes the fourth lens group and has the convex surface facing the object.

In the present invention, a lens component refers to a single lens or a cemented lens in which a plurality of lenses is cemented together.

In the present invention, it is preferable that the following conditional expression is satisfied:

$$0.5 < Fc/Fw < 10.0$$

where Fc denotes a focal length of the positive lens component which constitutes the fourth lens group and has the convex surface facing the object, and Fw denotes a focal length of the zoom lens upon focusing on infinity in the wide-angle end state.

In the present invention, it is preferable that the following conditional expression is satisfied:

$$1.0 < |Fa|/Fw < 30.0$$

where Fa denotes a focal length of the lens component which constitutes the fourth lens group and has positive or negative refractive power, and Fw denotes a focal length of the zoom lens upon focusing on infinity in the wide-angle end state.

In the present invention, it is preferable that the following conditional expression is satisfied:

$$1.0 < Fb/Fw < 10.0$$

where Fb denotes a focal length of the positive lens component which constitutes the fourth lens group, and Fw denotes a focal length of the zoom lens upon focusing on infinity in the wide-angle end state.

In the present invention, it is preferable that the following conditional expression is satisfied:

$$0.05 < (-F2)/F4 < 1.00$$

where F2 denotes a focal length of the second lens group, and F4 denotes a focal length of the fourth lens group.

In the present invention, it is preferable that the fourth lens group has at least one aspherical surface.

In the present invention, it is preferable that the positive lens component constituting the fourth lens group has at least one aspherical surface.

In the present invention, it is preferable that the positive lens component constituting the fourth lens group is an aspherical lens of which surface form changes so as to have positive refractive power in a neighborhood of the optical axis, and have negative refractive power in a peripheral area of the optical axis.

In the present invention, it is preferable that focusing of the zoom lens on a short distance object is performed by moving the second lens group on the optical axis.

An imaging device (e.g. mirrorless camera 1 in this embodiment) according to the present invention has one of the zoom lenses described above.

The present invention is also a method for manufacturing zoom lens including, in order from an object, a first lens group having positive refractive power, a second lens group having negative refractive power, a third lens group having positive refractive power and a fourth lens group having positive refractive power, wherein zooming is performed by changing an air gap between the lens groups, the fourth lens group includes, in order from the object, a lens component having positive or negative refractive power, a positive lens component, and a positive lens component having a convex surface facing the object, and each lens is assembled in a lens barrel so that the following conditional expression is satisfied:

$$0.00 < (Rc2-Rc1)/(Rc2+Rc1) < 1.00$$

where Rc2 denotes a radius of curvature of an image side surface of the positive lens component which constitutes the fourth lens group and has the convex surface facing the object, and Rc1 denotes a radius of curvature of an object side surface of the positive lens component which constitutes the fourth lens group and has the convex surface facing the object.

Advantageous Effects of the Invention

According to the present invention, a zoom lens which is miniaturized, constituted by a small number of lenses, has high performance and little aberrations, an imaging device including this zoom lens, and a method for manufacturing this zoom lens can be provided.

BRIEF DESCRIPTION OF THE DRAWINGS

FIG. 1 shows a configuration of a zoom lens according to Example 1 and a zoom track from a wide-angle end state (W) to a telephoto end state (T);

FIG. 3 shows a configuration of a zoom lens according to Example 2 and a zoom track from a wide-angle end state (W) to a telephoto end state (T);

FIG. 6 is a flow chart depicting a method for manufacturing the zoom lens according to the present embodiment.

DESCRIPTION OF THE EMBODIMENTS

Figure 2A:
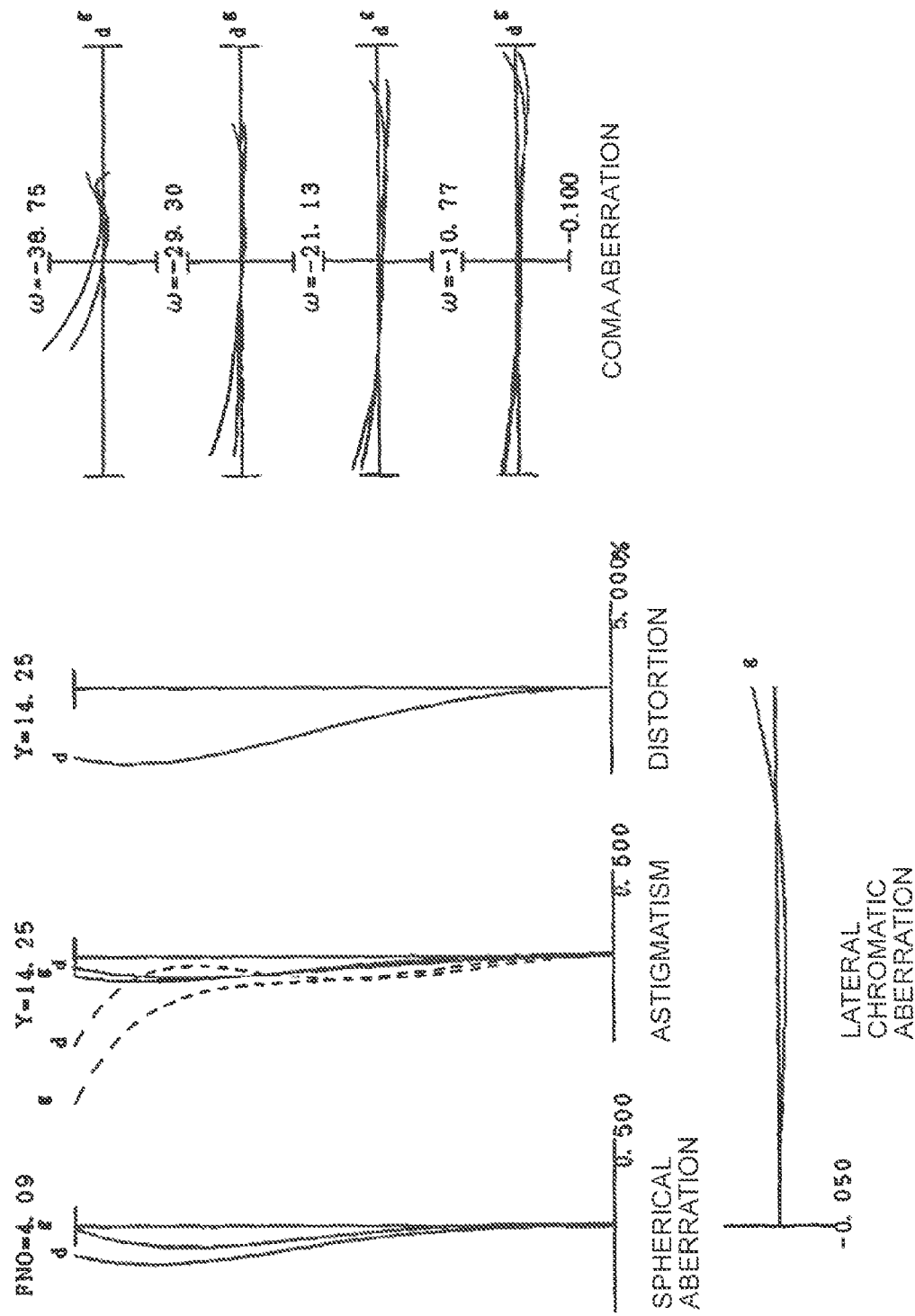
FIG. 2 are graphs showing various aberrations of the zoom lens according to Example 1, where FIG. 2A are graphs showing various aberrations of the zoom lens upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.

Embodiments of the present invention will now be described with reference to the drawings. As FIG. 1 shows, a zoom lens ZL according to the present invention includes, in order from an object: a first lens group G1 having positive refractive power; a second lens group G2 having negative refractive power; a third lens group G3 having positive refractive power; and a fourth lens group G4 having positive refractive power, wherein zooming is performed by changing an air gap between the lens groups, the fourth lens group G4 includes, in order from the object, a lens component La having positive or negative refractive power, a positive lens component Lb, and a positive lens component Lc having a convex surface facing the object, and the following conditional expression (1) is satisfied.

$$0.00 < (Rc2 - Rc1)/(Rc2 + Rc1) < 1.00 \quad (1)$$

where $Rc2$ denotes a radius of curvature of an image side surface of the positive lens component Lc which constitutes the fourth lens group G4 and has the convex surface facing the object, and $Rc1$ denotes a radius of curvature of an object side surface of the positive lens component Lc which constitutes the fourth lens group G4 and has the convex surface facing the object.

The present invention considers an effective means of miniaturizing a multigroup zoom lens having at least four lens groups (positive, negative, positive and positive). In particular, a focus of the present invention is the configuration of the fourth lens group G4. The fourth lens group G4 has a simple configuration of positive or negative, positive, and positive lens components, and succeeded in decreasing the back focus and the total length of the zoom lens without overly shortening the exit pupil. By this configuration, higher performance can also be implemented. Furthermore, the present invention becomes even more effective by optimizing the form for aberration correction, and setting optimum values for a focal length.

The zoom lens ZL of this embodiment will now be described according to each conditional expression.

The conditional expression (1) is a reciprocal number of a form factor (q factor) of the positive lens component Lc having a convex surface facing the object and constituting the fourth lens group G4. If the upper limit value 1.00 of the conditional expression (1) is exceeded, the form of the lens changes from a plano-convex form, of which convex surface faces the object, and becomes a biconvex form. In other words, if 1.00 is exceeded, the form of the lens greatly changes. If the lower limit value of the conditional expression (1) is less than 0.00, that is a negative value, then the form of the lens completely changes to a convex surface facing the image. In this way, the conditional expression (1) is a condition to determine a form of the positive lens component Lc having the convex surface facing the object in the fourth lens group G4:

If the upper limit value of the conditional expression (1) is exceeded, the form of the positive lens component Lc having the convex surface facing the object deviates from an optimum meniscus form, and changes from the plano-convex form having the convex surface facing the object to a biconvex form, as mentioned above. This is not desirable in terms of correcting aberrations, since coma aberration, curvature of field and astigmatism deteriorate.

If the upper limit value of the conditional expression (1) is 0.90, coma aberration and curvature of field can be corrected well. If the upper limit value of the conditional expression (1) is 0.88, coma aberration and curvature of field can be corrected well. If the upper limit value of the conditional expression (1) is 0.80, coma aberration and curvature of field can be corrected well.

If the upper limit value of the conditional expression (1) is 0.70, coma aberration and curvature of field can be corrected even better. If the upper limit value of the conditional expression (1) is 0.65, coma aberration and curvature of field can be corrected even better. If the upper limit value of the conditional expression (1) is 0.60, coma aberration and curvature of field can be corrected even better, and the effect of this embodiment can be demonstrated to the maximum.

If the lower limit value of the conditional expression (1) is not reached, the form of the positive lens component Lc having a convex surface facing the object deviates from an optimum meniscus form, and changes to a meniscus form having a convex surface facing the image, as mentioned above. This not only makes the back focus longer, but also makes it difficult to correct aberrations appropriately. Particularly spherical aberration and curvature of field deteriorate, which is not desirable.

If the lower limit value of the conditional expression (1) is 0.01, various aberrations can be corrected well. If the lower limit value of the conditional expression (1) is 0.05, various aberrations can be corrected well. If the lower limit value of the conditional expression (1) is 0.10, various aberrations can be corrected well.

If the lower limit value of the conditional expression (1) is 0.13, various aberrations can be corrected even better. If the lower limit value of the conditional expression (1) is 0.15, various aberrations can be corrected even better. If the lower limit value of the conditional expression (1) is 0.16, various aberrations can be corrected even better, and the effect of this embodiment can be demonstrated to the maximum.

In the zoom lens ZL according to this embodiment, it is preferable that the following conditional expression (2) is satisfied, where Fc denotes a focal length of the positive lens component Lc which constitutes the fourth lens group G4 and has a convex surface facing the object, and Fw denotes a focal length of the zoom lens upon focusing on infinity in the wide-angle end state.

$$0.5 < Fc/Fw < 10.0 \qquad (2)$$

The conditional expression (2) specifies the focal length of the positive lens component Lc which constitutes the fourth lens group G4 and has the convex surface facing the object, in other words, the conditional expression (2) specifies the refractive power of the positive lens component Lc having the convex surface facing the object.

If the upper limit value of the conditional expression (2) is exceeded, the focal length of the positive lens component Lc having the convex surface facing the object becomes long. In other words, the positive refractive power becomes weak. In this case, the rear lens diameter increases, curvature of field deteriorates, and variations of coma aberration by zooming increases, which is not desirable.

If the upper limit value of the conditional expression (2) is 9.0, various aberrations can be corrected well. If the upper limit value of the conditional expression (2) is 8.0, various aberrations can be corrected well.

If the upper limit value of the conditional expression (2) is 7.0, various aberrations can be corrected even better. If the upper limit value of the conditional expression (2) is 6.0, various Aberrations can be corrected even better. If the upper limit value of the conditional expression (2) is 5.0, various aberrations can be corrected even better, and the effect of this embodiment can be demonstrated to the maximum.

If the lower limit value of the conditional expression (2) is not reached, the focal length of the positive lens component Lc becomes short. In other words, the positive refractive power becomes strong. In this case, displacement due to an angle of view and variations by zooming increase respectively in spherical aberration, curvature of field and upward coma aberration, which is not desirable.

If the lower limit value of the conditional expression (2) is 0.7, various aberrations can be corrected well. If the lower limit value of the conditional expression (2) is 0.9, various aberrations can be corrected well.

if the lower limit value of the conditional expression (2) is 1.0, various aberrations can be corrected even better. If the lower limit value of the conditional expression (2) is 1.2, various aberrations can be corrected even better. If the lower limit value of the conditional expression (2) is 1.6, various aberrations can be corrected even better, and the effect of this embodiment can be demonstrated to the maximum.

In the zoom lens ZL according to this embodiment, it is preferable that the following conditional expression (3) is satisfied, where Fa denotes a focal length of the lens component La which constitutes the fourth lens group G4 and has positive or negative refractive power, and Fw denotes a focal length of the zoom lens upon focusing on infinity in the wide-angle end state.

$$1.0 < |Fa|/Fw < 30.0 \qquad (3)$$

The conditional expression (3) specifies a focal length of the lens component La which constitutes the fourth lens group G4 and has positive or negative refractive power, in other words, the conditional expression (3) specifies the refractive power of the lens component La. According to this embodiment, the lens component La has a relatively weak refractive power, and the lens component La as a whole can be designed to have a positive refractive power or a negative refractive power.

If the upper limit value of the conditional expression (3) is exceeded, the focal length of the lens component La becomes long. In other words, the (combined) refractive power of the lens component La becomes weak. In this case, the capability to correct spherical aberration, longitudinal chromatic aberration and lateral chromatic aberration decreases, which is not desirable.

If the upper limit value of the conditional expression (3) is 28.0, various aberrations can be corrected well. If the upper limit value of the conditional expression (3) is 24.0, various aberrations can be corrected well. If the upper limit value of the conditional expression (3) is 20.0, various aberrations can be corrected well.

If the upper limit value of the conditional expression (3) is 19.0, various aberrations can be corrected even better. If the upper limit value of the conditional expression (3) is 18.0, various aberrations can be corrected even better. If the upper limit value of the conditional expression (3) is 17.0, various aberrations can be corrected even better, and the effect of this embodiment can be demonstrated to the maximum.

If the lower limit value of the conditional expression (3) is not reached, the (combined) focal length of the lens component La becomes short. In other words, the (combined) refractive power of the lens component La becomes strong. In this case, variations of the spherical aberration and curvature of field at the telephoto end side increase, which is not desirable.

If the lower limit value of the conditional expression (3) is 2.0, various aberrations, including coma aberration, can be corrected well. If the lower limit value of the conditional expression (3) is 4.0, various aberrations, including coma aberration, can be corrected well.

If the lower limit value of the conditional expression (3) is 5.0, various aberrations, including coma aberration, can be corrected even better. If the lower limit value of the conditional expression (3) is 7.0, various aberrations, including coma aberration, can be corrected even better. If the lower limit value of the conditional expression (3) is 8.0, various aberrations, including coma aberration, can be corrected even better, and the effect of this embodiment can be demonstrated to the maximum.

In the zoom lens ZL according to this embodiment, it is preferable that the following conditional expression (4) is satisfied, where Fb denotes a focal length of the positive lens component Lb which constitutes the fourth lens group G4, and Fw denotes a focal length of the zoom lens upon focusing on infinity in the wide-angle end state.

$$1.0 < Fb/Fw < 10.0 \qquad (4)$$

The conditional expression (4) specifies a focal length of the positive lens component Lb which constitutes the fourth lens group G4, in other words, the conditional expression (4) specifies the refractive power of the positive lens component Lb.

If the upper limit value of the conditional expression (4) is exceeded, the focal length of the positive lens component Lb becomes long. In other words, the refractive power of the positive lens component Lb becomes weak. In this case, the capability to correct the spherical aberration and coma aberration decreases, which is not desirable.

If the upper limit value of the conditional expression (4) is 9.0, various aberrations can be corrected well. If the upper limit value of the conditional expression (4) is 8.0, various aberrations can be corrected well.

If the upper limit value of the conditional expression (4) is 7.5, various aberrations can be corrected even better. If the upper limit value of the conditional expression (4) is 7.0, various aberrations can be corrected even better. If the upper limit value of the conditional expression (4) is 6.5, various aberrations can be corrected even better, and the effect of this embodiment can be demonstrated to the maximum.

If the lower limit value of the conditional expression (4) is not reached, the focal length of the positive lens component Lb becomes short. This means that the refractive power of the positive lens component Lb becomes strong. This deteriorates variation of the spherical chromatic aberration and coma aberration by zooming in the telephoto end side, which is not desirable.

If the lower limit value of the conditional expression (4) is 2.0, various aberrations can be corrected well. If the lower limit value of the conditional expression (4) is 2.6, various aberrations can be corrected well.

If the lower limit value of the conditional expression (4) is 3.0, various aberrations can be corrected even better. If the lower limit value of the conditional expression (4) is 3.5, various aberrations can be corrected even better. If the lower limit value of the conditional expression (4) is 4.0, various aberrations can be corrected even better, and the effect of this embodiment can be demonstrated to the maximum.

In the zoom lens ZL according to this embodiment, it is preferable that the following conditional expression (5) is satisfied, where F2 denotes a focal length of the second lens group G2, and F4 denotes a focal length of the fourth lens group G4.

$$0.05 < (-F2)/F4 < 1.00 \quad (5)$$

The conditional expression (5) specifies a ratio of the focal length (absolute value) of the second lens group G2 and the focal length of the fourth lens group G4, in other words, the conditional expression (5) specifies a ratio of the refractive power of the second lens group G2 and the refractive power of the fourth lens group G4.

If the upper limit value of the conditional expression (5) is exceeded, the focal length of the fourth lens group G4 becomes short with respect to the focal length of the second lens group G2. In other words, the refractive power of the fourth lens group G4 becomes strong. In this case, variations of the spherical aberration, coma aberration and curvature of field by zooming in particular deteriorate in the telephoto end state, which are not desirable.

If the upper limit value of the conditional expression (5) is 0.90, various aberrations can be corrected well. If the upper limit value of the conditional expression (5) is 0.80, various aberrations can be corrected well.

If the upper limit value of the conditional expression (5) is 0.70, various aberrations can be corrected even better. If the upper limit value of the conditional expression (5) is 0.60, various aberrations can be corrected even better. If the upper limit value of the conditional expression (5) is 0.50, various aberrations can be corrected even better, and the effect of this embodiment can be demonstrated to the maximum.

If the lower limit value of the conditional expression (5) is not reached, the focal length (absolute value) of the second lens group G2 becomes short with respect to the focal length of the fourth lens group G4. In other words, the negative refractive power of the second lens group G2 becomes strong. In this case, variations of the coma aberration and curvature of field in the wide-angle end state and the needs for correcting the spherical aberration increase, which are not desirable.

If the lower limit value of the conditional expression (5) is 0.08, various aberrations can be corrected well. If the Tower limit value of the conditional expression (5) is 0.10, various aberrations can be corrected well.

If the lower limit value of the conditional expression (5) is 0.18, various aberrations can be corrected even better. If the lower limit value of the conditional expression (5) is 0.21, various aberrations can be corrected even better. If the lower limit value of the conditional expression (5) is 0.23, various aberrations can be corrected even better, and the effect of this embodiment can be demonstrated to the maximum.

In the zoom lens ZL according to this embodiment, it is preferable that the fourth lens group G4 has at least one aspherical surface. By this configuration, coma aberration and distortion can be corrected well.

In the zoom lens ZL according to this embodiment, it is even more preferable that the positive lens component Lb constituting the fourth lens group G4 has at least one aspherical surface. By this configuration, coma aberration and distortion can be corrected even better.

In the zoom lens ZL according to this embodiment, it is preferable that the positive lens component Lb constituting the fourth lens group G4 is an aspherical lens of which surface form Changes so as to have positive refractive power in a neighborhood of the optical axis, and have negative refractive power in a peripheral area of the optical axis. By this configuration, even better correction of coma aberration and distortion can be implemented.

In the zoom lens ZIP according to this embodiment, it is preferable that focusing of the zoom lens on a short distance object is performed by moving, on the optical axis, the second lens group G2 having negative refractive power. By this configuration, variation of short distance aberrations, particularly variation of curvature of field and coma aberration can be decreased, which is preferable.

Figure 5:
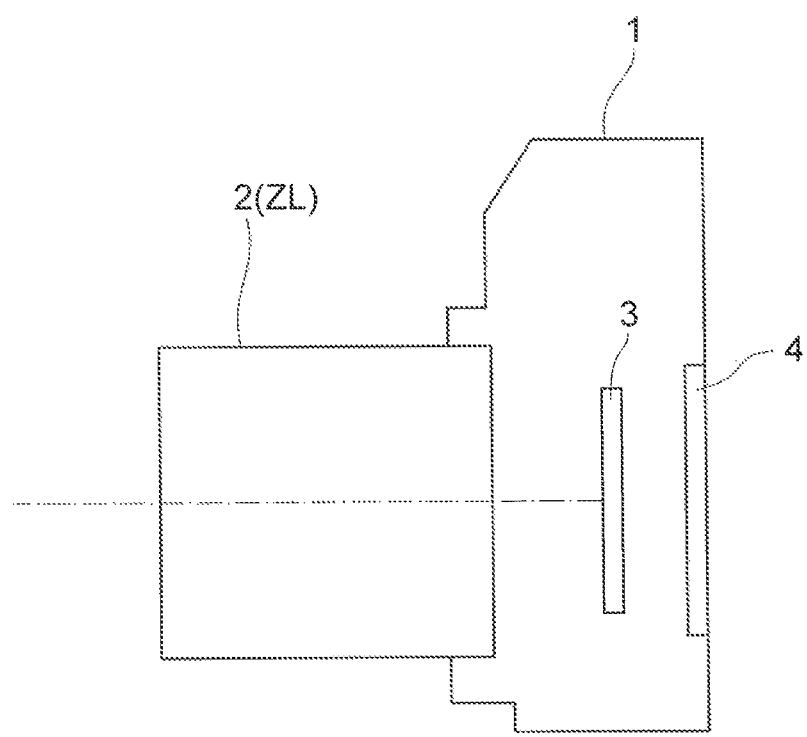
FIG. 5 is a cross-sectional view showing a configuration of a camera according to the present embodiment.

FIG. 5 is a cross-sectional view of a mirrorless camera 1 with interchangeable lenses (hereafter called "camera"), which is an example of an imaging device having the above mentioned zoom lens ZL. In this camera 1, light from an object (not illustrated) is collected by a camera lens 2 (zoom lens ZL according to this embodiment), and forms an object image on an imaging surface of an imaging unit 3 via an OLPF (optical low pass filter), which is not illustrated. The object image is photoelectric-converted by a photoelectric conversion element disposed in the imaging unit 3, whereby an image of the object is generated. This image is displayed on an EVF (electronic view finder) 4 disposed on the camera 1. Thereby the user can observe the object image via the EVF 4.

If the user presses a release button (not illustrated), the image, which was photoelectric-converted by the imaging unit 3, is stored in a memory (not illustrated). In this way, the user can photograph the object using this camera 1.

The camera 1 may removably hold the camera lens 2 (zoom lens ZL) or may integrate the camera lens 2 (zoom lens ZL) therein. Here the mirrorless camera is used as an example of the imaging device having the camera lens 2 (zoom lens ZL), but the present invention is not limited to the mirrorless camera, but may be a single-lens reflex camera where the camera main unit has a quick return mirror, and an object image is observed via a finder optical system.

The zoom lens ZL according to this embodiment, which is mounted as the camera lens 2 of this camera 1, is a super wide-angle lens which includes a wide-angle of view, with little spherical aberration, curvature of field, astigmatism and coma aberration because of the distinctive lens configuration, as shown in each example to be described later. Therefore this camera 1 can implement a wide-angle imaging device having a wide-angle of view with little spherical aberration, curvature of field, astigmatism and coma aberration.

A method for manufacturing the zoom lens ZL having the Above mentioned configuration will now be described with reference to FIG. 6. First the first lens group G1 to the fourth lens group G4 are assembled in a lens barrel (step S10). In this assemble step, each lens is arranged so that the first lens group G1 has positive refractive power, the second lens group G2 has negative refractive power, the third lens group G3 has positive refractive power, and the fourth lens group G4 has positive refractive power. The fourth lens group G4 is configured such that the lens component La having positive or negative refractive power, the positive lens component Lb, and the positive lens component Lc having the convex surface facing the object are arranged in order from the object (step S20).

An example of the lens arrangement according to this embodiment is: a cemented positive lens, in which a negative meniscus lens L11 having a convex surface facing the object and a positive meniscus lens L12 are cemented in order from the object, is arranged as the first lens group G1; a negative meniscus aspherical lens L21 which has a convex surface facing the object and an aspherical surface facing the image, a biconcave lens L22, and a cemented positive lens in which a biconvex lens L23 and a biconcave lens L24 are cemented, are arranged in order from the object as the second lens group G2; an aperture stop S, a biconvex lens L31, and a cemented positive lens in which a biconvex lens L32 and a biconcave lens L33 are cemented, are arranged in order from the object as the third lens group G3; and a cemented positive lens component La (corresponding to the lens component having positive or negative refractive power in the claims) in which a positive meniscus lens L41 having a convex surface facing the object and a negative meniscus lens L42 having a convex surface facing the object are cemented, an aspherical positive lens Lb (corresponding to the positive lens component in the claims) having an aspherical surface facing the image, and a positive meniscus lens Lc (corresponding to the positive lens component having a convex surface facing the object in the claims) having a convex surface facing the object are arranged in order from the object as the fourth lens group G4 (see FIG. 1).

Then each lens is arranged so that the air gap between the lens groups changes upon zooming from the wide-angle end state to the telephoto end state (in other words, the gap between the first lens group G1 and the second lens group G2 changes, the gap between the second lens group G2 and the third lens group G3 changes, and the gap between the third lens group G3 and the fourth lens group G4 changes) (step S30).

Then each lens is arranged so that the following conditional expression (1) is satisfied, where R2 denotes a radius of curvature of the image side surface of the positive lens component Lc which constitutes the fourth lens group G4 and has a convex surface facing the object, and Rc1 denotes a radius of curvature of the object side surface of the positive lens component Lc which constitutes the fourth lens group G4 and has the convex surface facing the object (step S40).

$$0.00 < (Rc2-Rc1)/(Rc2+Rc1) < 1.00 \quad (1)$$

if the manufacturing method according to this embodiment is used, a zoom lens ZL which is miniaturized, constituting a small number of lenses, having high performance and little aberrations, can be implemented.

EXAMPLES

Each example of this embodiment will now be described with reference to the drawings. The following Table 1 and Table 2 are tables of various data of Example 1 and Example 2 respectively.

In [Surface data] in each table, a surface number indicates a sequence of the lens surface from the object side along the light traveling direction, r denotes a radius of curvature of each lens surface, d denotes a distance from each optical surface to the next optical surface (or image plane) on the optical axis, nd denotes a refractive index with respect to d-line (wavelength: 587.6 nm), vd denotes an Abbe number of the lens material at d-line, (variable) indicates a variable surface distance, and (stop S) indicates an aperture stop S. "∞" in the column of radius of curvature r indicates a plane. The refractive index of air (d-line) 1.000000 is omitted.

In [Aspherical data] a form of the aspherical surface shown in [Surface data] is given by the following expression (a), where y denotes a height in a direction perpendicular to the optical axis, X(y) denotes a displacement (sag) in the optical axis direction at the height y, r denotes a radius of curvature (paraxial radius of curvature) of the reference spherical surface, κ denotes a conical coefficient, and An denotes an aspherical coefficient in degree n. "E–n" indicates "×10$^{-n}$", and "1.234E–05", for example, indicates "1.234×10$^{-5}$".

$$X(y)=(y^2/r)/[1+\{1-\kappa(y^2/r^2)\}^{1/2}]+A4{\times}y^4+A6{\times}y^6+A8{\times}y^8+A10{\times}y^{10}+A12{\times}y^{12} \quad (a)$$

In [Various data] in each table, f denotes a focal length, FNO denotes an F number, ω denotes a half angle of view (unit: degree), Y denotes an image height, TL denotes a total lens length, Σd denotes a distance, on the optical axis, from the lens surface closest to the object to the lens surface closest to the image in the zoom lens ZL, and BF denotes back focus.

In [Lens group distance data], Di (i is an integer) in each state of the wide-angle end state, intermediate focal length state and telephoto end state at infinity, the intermediate focal point and the short distance object point indicate a variable distance between the i-th surface and the (i+1)-th surface.

In [Zoom lens group data] in each table, G denotes a group number, "First surface of group" indicates a surface number of a surface closest to the object in each group, and "Group focal length" indicates a focal length of each group.

In [Conditional expression] in each table, a correspondence value of each conditional expression (1) to (5) is shown.

In all the data values, "mm" is normally used as the unit of focal length f, radius of curvature r, surface distance d and other lengths, but unit is not limited to "mm", since an equivalent optical performance is obtained even if an optical system is proportionally expanded or proportionally reduced. Unit is not limited to "mm" but another appropriate unit can be used.

The description on the table is the same for other examples, and is therefore omitted hereinbelow.

Example 1

Example 1 will be described with reference to FIG. 1, FIG. 2 and Table 1. FIG. 1 shows a configuration of a zoom lens ZL (ZL1) according to Example 1 and a zoom track from the wide-angle end state (W) to a telephoto end state (T). As FIG. 1 shows, the zoom lens ZL1 according to Example 1 includes, in order from the object: a first lens group G1 having positive refractive power; a second lens group G2 having negative refractive power; a third lens group G3 having positive refractive power; and a fourth lens group G4 having positive refractive power, wherein zooming is performed by changing an air gap between the lens groups.

The first lens group G1 is configured of a cemented positive lens in which a negative meniscus lens L11 having a convex surface facing the object and a positive meniscus lens L12 are cemented in order from the object.

The second lens group G2 is configured of, in order from the object, a negative meniscus aspherical lens L21 having a convex surface facing the object and an aspherical surface facing the image, a biconcave lens L22, and a cemented positive lens in which a biconvex lens L23 and a biconcave lens L24 are cemented.

The third lens group G3 is configured of, in order from the object, an aperture stop S, a biconvex lens L31, and a cemented positive lens in which a biconvex lens L32 and a biconcave lens L33 are cemented.

The fourth lens group G4 is configured of, in order from the object, a cemented positive lens component La (corresponding to the lens component having positive or negative refractive power in the claims) in which a positive meniscus lens L41 having a convex surface facing the object and a negative meniscus lens L42 having a convex surface facing the object are cemented, an aspherical positive lens Lb (corresponding to the positive lens component in the claims) having an aspherical surface facing the image, and a positive meniscus lens Lc (corresponding to the positive lens component having a convex surface facing the object in the claims) having a convex surface facing the object.

Table 1 shows data of Example 1. The surface numbers 1 to 23 in Table 1 correspond to the surfaces 1 to 23 shown in FIG. 1 respectively. In Example 1, Surface 5 and Surface 21 are formed to be aspherical.

TABLE 1

[Surface data]

| Surface number | r | d | vd | nd |
|---|---|---|---|---|
| 1 | 48.9532 | 1.5000 | 23.78 | 1.846660 |
| 2 | 31.6260 | 4.5000 | 52.29 | 1.755000 |
| 3 | 1080.4260 | D3(variable) | | |
| 4 | 60.4611 | 1.0000 | 46.63 | 1.816000 |
| *5 | 10.3095 | 3.5000 | | |
| 6 | −44.6530 | 1.0000 | 46.63 | 1.816000 |
| 7 | 29.6472 | 1.0000 | | |
| 8 | 15.8079 | 3.5000 | 32.35 | 1.850260 |
| 9 | −25.2182 | 1.0000 | 55.52 | 1.696800 |
| 10 | 22.9141 | D10(variable) | | |
| 11 | (Stop S) | 0.5280 | | |
| 12 | 27.4754 | 1.7000 | 58.22 | 1.622990 |
| 13 | −186.2088 | 0.0660 | | |
| 14 | 10.2489 | 3.8000 | 82.56 | 1.497820 |
| 15 | −52.2201 | 1.0000 | 32.35 | 1.850260 |
| 16 | 24.1505 | D16(variable) | | |
| 17 | 14.5831 | 3.0000 | 82.56 | 1.497820 |
| 18 | 45.3366 | 1.0000 | 46.79 | 1.766840 |
| 19 | 20.5565 | 1.0000 | | |
| 20 | −359.3884 | 1.5000 | 61.18 | 1.589130 |
| *21 | −57.4639 | 0.1000 | | |
| 22 | 15.4830 | 2.0000 | 64.12 | 1.516800 |
| 23 | 22.3812 | BF | | |

[Aspherical data]

Surface 5

$\kappa = 0.6317$,
$A4 = 6.36679E-05$, $A6 = 1.54019E-06$, $A8 = -2.09414E-08$,
$A10 = 4.45439E-10$, $A12 = 0.00000$ TABLE 1-continued Surface 21

$\kappa = 85.0068$,
$A4 = 3.00611E-04$, $A6 = -7.62759E-07$, $A8 = 3.26240E-07$,
$A10 = -1.04496E-08$, $A12 = 0.15488E-09$

| | Wide-angle end | Intermediate focal length | Telephoto end |
|---|---|---|---|
| [Various data] | | | |
| Zoom ratio 2.88649 | | | |
| f = | 18.5~ | 35.0~ | 53.4 |
| FNO = | 4.10~ | 5.32~ | 5.89 |
| ω = | 38.75~ | 21.64~ | 14.37 |
| Y = | 14.25~ | 14.25~ | 14.25 |
| TL = | 72.86~ | 85.43~ | 98.65 |
| Σd = | 47.83~ | 47.93~ | 52.86 |
| BF = | 25.03~ | 37.49~ | 45.79 |
| [Lens group distance data] | | | |
| Infinity | | | |
| F | 18.50000 | 35.00000 | 53.40001 |
| D0 | 0.0000 | 0.0000 | 0.0000 |
| D3 | 1.71849 | 9.25813 | 17.19304 |
| D10 | 10.69029 | 4.48041 | 1.97857 |
| D16 | 2.73006 | 1.50082 | 0.99646 |
| BF | 25.02642 | 37.49196 | 45.78810 |
| Intermediate focal point | | | |
| β | −0.02500 | −0.02500 | −0.02500 |
| D0 | 710.4336 | 1351.3893 | 2057.4784 |
| D3 | 1.35484 | 8.99296 | 16.93149 |
| D10 | 11.05394 | 4.74559 | 2.24011 |
| D16 | 2.73006 | 1.50082 | 0.99646 |
| BF | 25.02647 | 37.49201 | 45.78815 |
| Short distance | | | |
| β | −0.06055 | −0.11272 | −0.16490 |
| D0 | 277.0305 | 264.4644 | 251.2396 |
| D3 | 0.84652 | 8.08729 | 15.53491 |
| D10 | 11.56226 | 5.65125 | 3.63670 |
| D16 | 2.73006 | 1.50082 | 0.99646 |
| BF | 25.02671 | 37.49295 | 45.79023 |

[Zoom lens group data]

| Group number | First surface of group | Group focal length |
|---|---|---|
| G1 | 1 | 72.597 |
| G2 | 4 | −11.880 |
| G3 | 12 | 24.107 |
| G4 | 17 | 41.578 |

[Conditional expression]

| Conditional expression (1) | (Rc2 − Rc1)/(Rc2 + Rc1) = 0.1822 |
|---|---|
| Conditional expression (2) | Fc/Fw = 4.728 |
| Conditional expression (3) | |Fa|/Fw = 9.402 |
| Conditional expression (4) | Fb/Fw = 6.264 |
| Conditional expression (5) | (−F2)/F4 = 0.2857 |

As the data in Table 1 shows, the zoom lens ZL1 according to this example satisfies all the conditional expressions (1) to (5).

FIG. 2 are graphs showing various aberrations of the zoom lens ZL1 according to Example 1, where FIG. 2A are graphs showing various aberrations of the zoom lens upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.

In each graph showing aberrations, FNO denotes an F number, Y denotes an image height, ω denotes a half angle of view, d denotes d-line (wavelength: 587.6 nm), and g denotes g-line (wavelength: 435.8 nm). In graphs showing astigmatism, the solid line indicates the sagittal image plane, and the broken line indicates the meridional image plane. In the graph showing coma aberration, the solid line indicates meridional coma. The description on the graphs showing aberrations is the same for the other examples.

As each graph showing aberrations clarifies, in Example 1, various aberrations, including spherical aberration, curvature of field, astigmatism and coma aberration, are corrected well in each focal length state, from the wide-angle end state to the telephoto end state.

Example 2

Example 2 will be described with reference to FIG. 3, FIG. 4 and Table 2. FIG. 3 shows a configuration of a zoom lens ZL (ZL2) according to Example 2, and a zoom track from wide-angle end state (W) to a telephoto end state (T). As FIG. 3 shows, the zoom lens ZL2 according to Example 2 includes, in order from an object: a first lens group G1 having positive refractive power; a second lens group G2 having negative refractive power; a third lens group G3 having positive refractive power; and a fourth lens group G4 having positive refractive power, wherein zooming is performed by changing an air gap between the lens groups.

The first lens group G1 is configured of a cemented positive lens in which a negative meniscus lens L11 having a convex surface facing the object and a positive meniscus lens L12 are cemented in order from the object.

The second lens group G2 is configured of, in order from the object, a negative meniscus aspherical lens 121 having a convex surface facing the object and an aspherical surface facing the image, a biconcave lens L22, and a cemented positive lens in which a biconvex lens L23 and a biconcave lens L24 are cemented.

The third lens group G3 is configured of, in order from the object, an aperture stop S, a biconvex lens L31, and a cemented positive lens in which a biconvex lens L32 and a biconcave lens L33 are cemented.

The fourth lens group G4 is configured of, in order from the object, a cemented negative lens component La (corresponding to the lens component having positive or negative refractive power in the claims) in which a positive meniscus lens L41 having a convex surface facing the object and a negative meniscus lens L42 having a convex surface facing the object are cemented, an aspherical positive lens Lb (corresponding to the positive lens component in the claims) having an aspherical surface facing the image, and a positive meniscus lens Lc (corresponding to the positive lens component having a convex surface facing the object in the claims) having a convex surface facing the object.

Table 2 shows data of Example 2. The surface numbers 1 to 23 in Table 2 correspond to the surfaces 1 to 23 shown in FIG. 3 respectively. In Example 2, Surface 5 and Surface 21 are formed to be aspherical.

TABLE 2

[Surface data]

| Surface number | r | d | vd | nd |
|---|---|---|---|---|
| 1 | 50.6870 | 2.0000 | 23.78 | 1.846660 |
| 2 | 31.5124 | 4.0000 | 52.29 | 1.755000 |
| 3 | 9833.2698 | D3(variable) | | |
| 4 | 658.2214 | 1.0000 | 46.63 | 1.816000 |
| *5 | 9.3015 | 3.0000 | | |
| 6 | −60.8240 | 1.0000 | 46.63 | 1.816000 |
| 7 | 43.2329 | 0.2000 | | |
| 8 | 14.9486 | 3.5000 | 32.35 | 1.850260 |
| 9 | −20.1843 | 1.0000 | 52.29 | 1.755000 |
| 10 | 28.2808 | D10(variable) | | |
| 11 | (Stop S) | 0.5280 | | |
| 12 | 20.7025 | 2.0000 | 64.12 | 1.516800 |
| 13 | −129.0058 | 0.0660 | | |
| 14 | 11.0007 | 3.0000 | 82.56 | 1.497820 |
| 15 | −129.8225 | 1.0000 | 32.35 | 1.850260 |
| 16 | 23.0798 | D16(variable) | | |
| 17 | 9.1813 | 2.5000 | 82.56 | 1.497820 |
| 18 | 100.0000 | 1.0000 | 52.29 | 1.755000 |
| 19 | 11.0560 | 1.0000 | | |
| 20 | 39.8990 | 1.0000 | 46.63 | 1.816000 |
| *21 | 70.9907 | 1.0000 | | |
| 22 | 16.4865 | 2.5000 | 64.12 | 1.516800 |
| 23 | 54.1059 | BF | | |

[Aspherical data]

Surface 5

κ = 0.5620,
A4 = 7.24635E−05, A6 = 9.55776E−07, A8 = −1.17499E−08,
A10 = 3.40634E−10, A12 = 0.00000

Surface 21

κ = 37.0005,
A4 = 1.83910E−04, A6 = 9.38821E−07, A8 = 8.82314E−08,
A10 = −1.00283E−09, A12 = 0.00000

| | Wide-angle end | Intermediate focal length | Telephoto end |
|---|---|---|---|
| [Various data] Zoom ratio 2.88649 | | | |
| f = | 18.5~ | 35.0~ | 53.4 |
| FNO = | 4.11~ | 5.31~ | 5.88 |
| ω = | 39.21~ | 21.71~ | 14.38 |
| Y = | 14.25~ | 14.25~ | 14.25 |
| TL = | 72.11~ | 84.60~ | 98.00 |
| Σd = | 48.13~ | 48.13~ | 53.31 |
| BF = | 23.97~ | 36.47~ | 44.69 |
| [Lens group distance data] Infinity | | | |
| F | 18.50000 | 35.00001 | 53.40000 |
| D0 | 0.0000 | 0.0000 | 0.0000 |
| D3 | 2.53306 | 10.02908 | 18.06850 |
| D10 | 10.45970 | 4.24485 | 1.74958 |
| D16 | 3.84687 | 2.56570 | 2.20003 |
| BF | 23.97417 | 36.46753 | 44.68808 |
| Intermediate focal point | | | |
| β | −0.02500 | −0.02500 | −0.02500 |
| D0 | 710.4166 | 1351.5012 | 2057.1742 |
| D3 | 2.16941 | 9.76444 | 17.80604 |
| D10 | 10.82335 | 4.50949 | 2.01203 |
| D16 | 3.84687 | 2.56570 | 2.20003 |
| BF | 23.97417 | 36.46753 | 47.68808 |
| Short distance | | | |
| β | −0.07222 | −0.13418 | −0.19504 |
| D0 | 227.8922 | 215.3988 | 201.9998 |
| D3 | 1.49608 | 8.64442 | 16.11590 |
| D10 | 11.49668 | 5.62951 | 3.70217 |
| D16 | 3.84687 | 2.56570 | 2.20003 |
| BF | 23.97417 | 36.46753 | 44.68808 |

[Zoom lens group data]

| Group number | First surface of group | Group focal length |
|---|---|---|
| G1 | 1 | 72.597 |
| G2 | 4 | −11.880 |

TABLE 2-continued

| | | |
|---|---|---|
| G3 | 12 | 24.107 |
| G4 | 17 | 41.578 |

| [Conditional expression] | |
|---|---|
| Conditional expression (1) | (Rc2 − Rc1)/(Rc2 + Rc1) = 0.5329 |
| Conditional expression (2) | Fc/Fw = 2.425 |
| Conditional expression (3) | |Fa|/Fw = 16.597 |
| Conditional expression (4) | Fb/Fw = 5.949 |
| Conditional expression (5) | (−F2)/F4 = 0.2857 |

As the data in Table 2 shows, the zoom lens ZL2 according to this example satisfies all the conditional expressions (1) to (5).

Figure 4A:
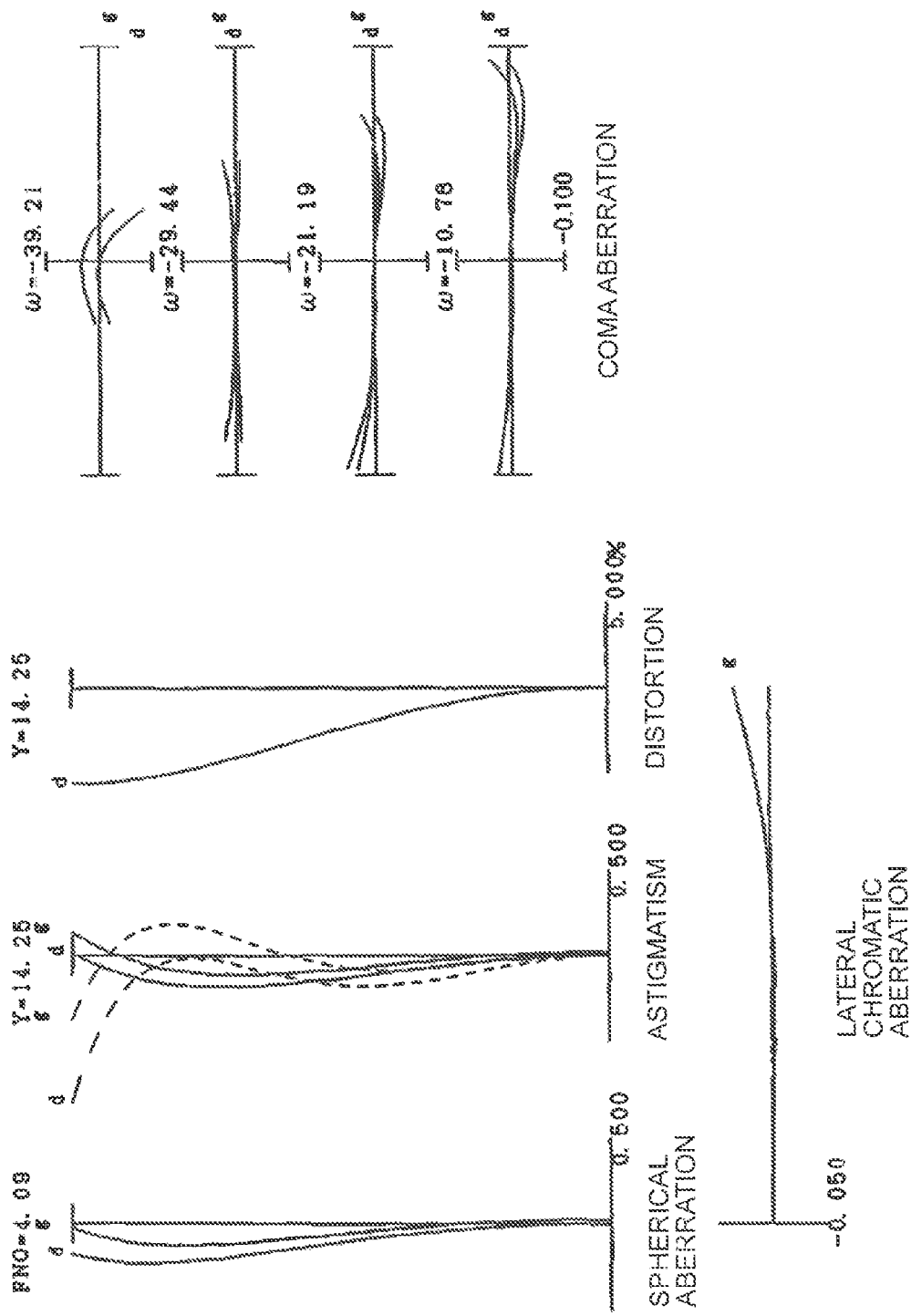
FIG. 4 are graphs showing various aberrations of the zoom lens according to Example 2, where FIG. 4A are graphs showing various aberrations of the zoom lens upon focusing on infinity in the wide-angle end state, FIG. 4B are graphs showing various aberrations of the zoom lens upon focusing on infinity in the intermediate focal length state, and FIG. 4C are graphs showing various aberrations of the zoom lens upon focusing on infinity in the telephoto end state.
Figure 4B:
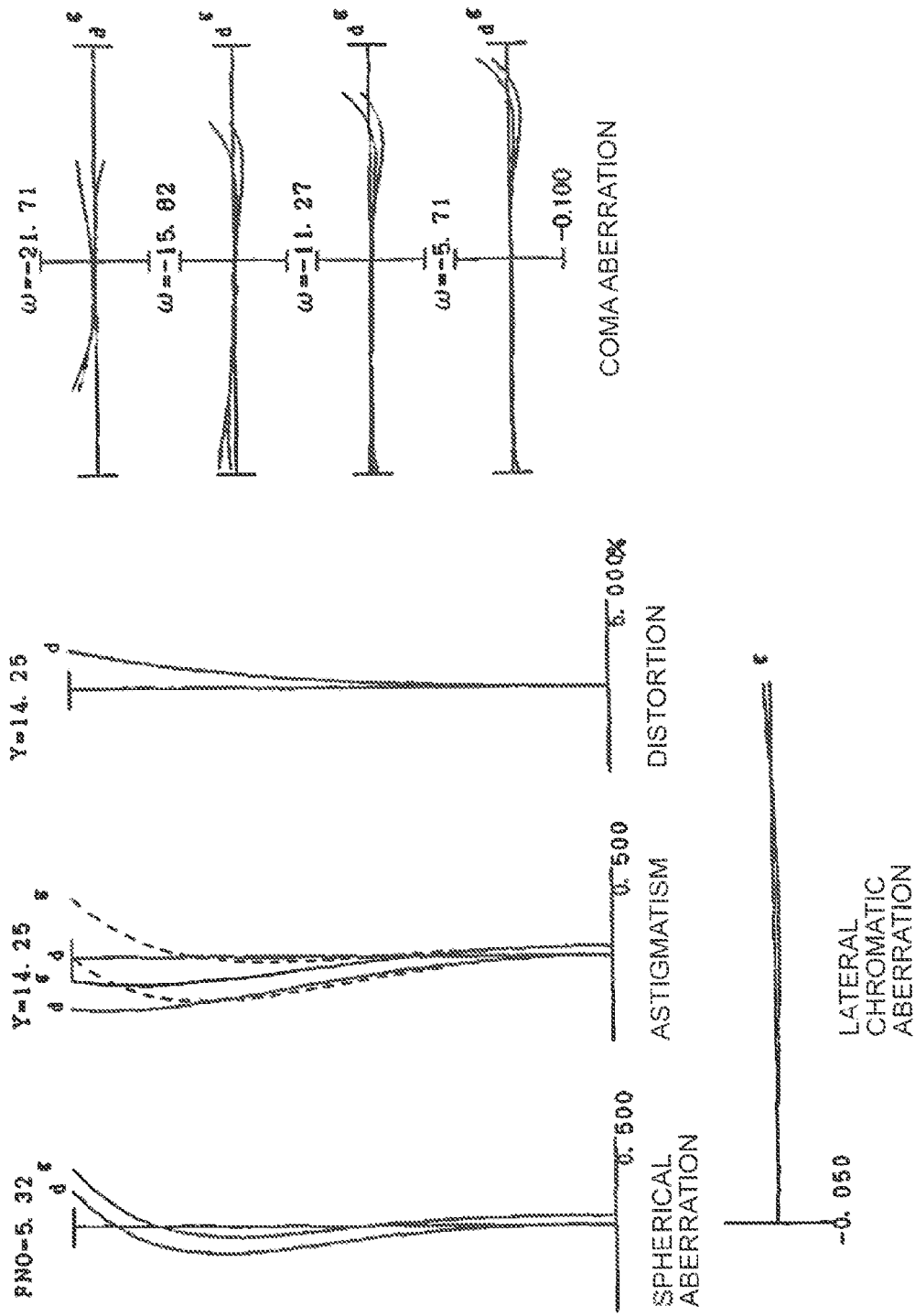

FIG. 4 are graphs showing various aberrations of the zoom lens ZL2 according to Example 2, where FIG. 4A are graphs showing various aberrations of the zoom lens upon focusing on infinity in the wide-angle end state, FIG. 4B are graphs showing various aberrations of the zoom lens upon focusing on infinity in the intermediate focal length state, and FIG. 4C are graphs showing various aberrations of the zoom lens upon focusing on infinity in the telephoto end state. As each graph showing aberrations clarifies, in Example 2, various Aberrations, including spherical aberration, curvature of field, astigmatism and coma aberration, are corrected well in each focal length state, from the wide-angle end state to the telephoto end state.

According to each of the above examples, features of a zoom lens to be implemented are: the included angle in the wide-angle end state exceeds 2ω=78.2°, aperture is about F4 to 5.6, relatively compact and short front lens diameter; high performance; and various aberrations including spherical aberration, curvature of field, astigmatism and coma aberration are corrected well. Each of the above mentioned examples is merely illustrative, and are not intended to limit the scope of the zoom lens according to this embodiment.

In the above embodiment, the following content can be adopted within a range where the optical performance is not diminished.

In each example, the zoom lens is configured of four lens groups, but the present invention can also be applied to a configuration using a different number of lens groups, such as five lens groups or six lens groups. In the configuration, a lens or a lens group may be added to the side closest to the object, or a lens or a lens group may be added to the side closest to the image. A "lens group" refers to a portion having at least one lens isolated by an air gap which changes upon zooming.

In this embodiment, a single or plurality of lens group(s) or a partial lens group may be designed to be a focusing lens group which performs focusing from an object at infinity to an object at short distance by moving in the optical axis direction. This focusing lens group can be applied to auto focus, and is also suitable for driving a motor for auto focusing (driving using an ultrasonic motor). It is particularly preferable that the second lens group is designed to be a focusing lens group.

In this embodiment, a lens group or a partial lens group may be designed to be a vibration-isolating lens group, which corrects image blurs generated by hand motion by moving the lens group or the partial lens group in a direction perpendicular to the optical axis or rotating (oscillating) the lens group or the partial lens group in an in-plane direction including the optical axis. It is particularly preferable that at least a part of the third lens group is designed to be a vibration-isolating lens group.

In this embodiment, the lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment, can be prevented. If the lens surface is an aspherical surface, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or a plastic lens.

In this embodiment, it is preferable that the aperture stop is disposed near the third lens group, but the role of the aperture stop may be substituted by the frame of the lens, without disposing a separate element as the aperture stop.

In this embodiment, each lens surface may be coated with an antireflection film which has high transmittance in a wide wavelength region, in order to decrease ghosts and flares, and implement a high optical performance at high contrast.

As described above, according to the present invention, a zoom lens which is miniaturized and has a small filter diameter, constituted by a small number of lenses, and has high performance and little aberrations including curvature of field, coma aberration, spherical aberration and astigmatism, an imaging device including this zoom lens, and a method for manufacturing this zoom lens can be provided.

Although the present invention has been described with reference to the configuration requirements of the embodiments, the present invention shall not be limited to this description.

EXPLANATION OF NUMERALS AND CHARACTERS

ZL (ZL1 to ZL2) zoom lens
G1 first lens group
G2 second lens group
G3 third lens group
G4 fourth lens group
La lens component having positive or negative refractive power
Lb positive lens component
Lc positive lens component having a convex surface facing the object
S aperture stop
1 mirrorless camera (imaging device)
2 camera lens (zoom lens)
I image plane

The invention claimed is:
1. A zoom lens comprising, in order from an object:
a first lens group having positive refractive power;
a second lens group having negative refractive power;
a third lens group having positive refractive power; and
a fourth lens group having positive refractive power,
performing zooming by changing an air gap between the lens groups,
the fourth lens group including, in order from the object, a lens component having positive or negative refractive power, a positive lens component, and a positive lens component having a convex surface facing the object, and the following conditional expression being satisfied:

$$0.00 < (Rc2 - Rc1)/(Rc2 + Rc1) < 1.00$$

where Rc2 denotes a radius of curvature of an image side surface of the positive lens component which constitutes the fourth lens group and has the convex surface facing the object, and Rc1 denotes a radius of curvature of an object side surface of the positive lens component which constitutes the fourth lens group and has the convex surface facing the object wherein
the following conditional expression is satisfied:

$$4.0 < Fb/Fw < 9.0$$

where Fb denotes a focal length of the positive lens component which constitutes the fourth lens group, and Fw denotes a focal length of the zoom lens upon focusing on infinity in the wide-angle end state.

2. The zoom lens according to claim 1, wherein
the following conditional expression is satisfied:

$$0.5 < Fc/Fw < 10.0$$

where Fc denotes a focal length of the positive lens component which constitutes the fourth lens group and has the convex surface facing the object, and Fw denotes a focal length of the zoom lens upon focusing on infinity in the wide-angle end state.

3. The zoom lens according to claim 1, wherein
the following conditional expression is satisfied:

$$1.0 < |Fa|/Fw < 30.0$$

where Fa denotes a focal length of the lens component which constitutes the fourth lens group and has positive or negative refractive power, and Fw denotes a focal length of the zoom lens upon focusing on infinity in the wide-angle end state.

4. The zoom lens according to claim 1, wherein
the following conditional expression is satisfied:

$$0.05 < (-i\ F2)/F4 < 1.00$$

where F2 denotes a focal length of the second lens group, and F4 denotes a focal length of the fourth lens group.

5. The zoom lens according to claim 1, wherein
the fourth lens group has at least one aspherical surface.

6. The zoom lens according to claim 1, wherein
the positive lens component constituting the fourth lens group has at least one aspherical surface.

7. The zoom lens according to claim 1, wherein
the positive lens component constituting the fourth lens group is an aspherical lens of which surface form changes so as to have positive refractive power in a neighborhood of the optical axis, and have negative refractive power in a peripheral area thereof.

8. The zoom lens according to claim 1, wherein
focusing of the zoom lens on a short distance object is performed by moving the second lens group on the optical axis.

9. An imaging device comprising the zoom lens according to claim 1.

10. A method for manufacturing a zoom lens comprising, in order from an object, a first lens group having positive refractive power, a second lens group having negative refractive power, a third lens group having positive refractive power, and a fourth lens group having positive refractive power, the method comprising:
performing zooming by changing an air gap between the lens groups,
the fourth lens group including, in order from the object, a lens component having positive or negative refractive power, a positive lens component, and a positive lens component having a convex surface facing the object, and
the method further comprising:
assembling each lens in a lens barrel so that the following conditional expression is satisfied:

$$0.00 < (Rc2-Rc1)/(Rc2+Rc1) < 1.00$$

where Rc2 denotes a radius of curvature of an image side surface of the positive lens component which constitutes the fourth lens group and has the convex surface facing the object, and Rc1 denotes a radius of curvature of an object side surface of the positive lens component which constitutes the fourth lens group and has the convex surface facing the object wherein
the following conditional expression is satisfied:

$$4.0 < Fb/Fw < 9.0$$

where Fb denotes a focal length of the positive lens component which constitutes the fourth lens group, and Fw denotes a focal length of the zoom lens upon focusing on infinity in the wide-angle end state.

* * * * *